(12) United States Patent
Blaker et al.

(10) Patent No.: US 8,189,591 B2
(45) Date of Patent: May 29, 2012

(54) METHODS, SYSTEMS AND COMPUTER PROGRAM PRODUCTS FOR PACKET ORDERING FOR PARALLEL PACKET TRANSFORM PROCESSING

(75) Inventors: David M. Blaker, Chapel Hill, NC (US); Raymond Savarda, Apex, NC (US)

(73) Assignee: Exar Corporation, Fremont, CA (US)

( * ) Notice: Subject to any disclaimer, the term of this patent is extended or adjusted under 35 U.S.C. 154(b) by 3019 days.

(21) Appl. No.: 09/999,647

(22) Filed: Oct. 30, 2001

(65) Prior Publication Data

US 2003/0081600 A1 May 1, 2003

(51) Int. Cl.
*H04L 12/56* (2006.01)
(52) U.S. Cl. .................. 370/394; 370/473
(58) Field of Classification Search .......... 370/394, 370/473, 474
See application file for complete search history.

(56) References Cited

U.S. PATENT DOCUMENTS

| | | | | |
|---|---|---|---|---|
| 5,329,623 | A | 7/1994 | Smith et al. | 395/275 |
| 5,455,863 | A | 10/1995 | Brown et al. | 380/23 |
| 5,485,474 | A | 1/1996 | Rabin | 371/37.1 |
| 5,602,920 | A | 2/1997 | Bestler et al. | 380/49 |
| 5,848,067 | A * | 12/1998 | Osawa et al. | 370/395.61 |
| 5,961,626 | A | 10/1999 | Harrison et al. | 710/129 |
| 6,081,895 | A | 6/2000 | Harrison et al. | 713/189 |
| 6,119,215 | A | 9/2000 | Key et al. | 712/19 |
| 6,122,714 | A | 9/2000 | VanDoren et al. | 711/150 |
| 6,157,955 | A | 12/2000 | Narad et al. | 709/228 |
| 6,219,789 | B1 | 4/2001 | Little et al. | 713/200 |
| 6,389,018 | B1 * | 5/2002 | Clauberg | 370/394 |
| 6,646,986 | B1 * | 11/2003 | Beshai | 370/230.1 |
| 6,832,261 | B1 * | 12/2004 | Westbrook et al. | 709/236 |
| 6,876,657 | B1 * | 4/2005 | Brewer et al. | 370/394 |
| 2002/0027917 | A1 * | 3/2002 | Sugai et al. | 370/394 |

FOREIGN PATENT DOCUMENTS

| | | |
|---|---|---|
| EP | 0 389 175 A | 9/1990 |
| EP | 0 395 958 A | 11/1990 |
| EP | 0 560 020 A2 | 9/1993 |
| EP | 0 668 560 A | 8/1995 |
| JP | 07074754 | 3/1995 |

(Continued)

OTHER PUBLICATIONS

TranSwitch Data Sheet. TranSwitch Corporation, Shelton, Connecticut, Document No. TXC-05804-MB, Ed. 5, Oct. 2001.

(Continued)

*Primary Examiner* — Kwang B Yao
*Assistant Examiner* — Nguyen Ngo
(74) *Attorney, Agent, or Firm* — Myers Bigel Sibley & Sajovec (57) ABSTRACT

Packets are processed while maintaining a sequence of the packets. Packets are received and a sequence identifier assigned to the packets. The sequence identifier specifies a serial order associated with the packet. The packets are provided to a plurality of parallel packet transform processors and the packets are processed utilizing the packet transform processors. The processed packets are ordered based on the sequence identifier of the packets. The packets may be evaluated to classify the packets so as to identify related packets. A sequence identifier is assigned to the packets such that the sequence identifier identifies an ordering of the related packets. The processed packets are ordered based on the classification of the packets and the sequence identifier of the packets. Parallel packet transform processing may be particularly well suite to parallel cryptographic processing.

49 Claims, 8 Drawing Sheets

FOREIGN PATENT DOCUMENTS

| | | |
|---|---|---|
| KR | 8-511388 | 11/1996 |
| WO | WO 94/29988 | 12/1994 |
| WO | WO 97 35252 A | 9/1997 |
| WO | WO 99/07180 | 2/1999 |
| WO | WO 00/04494 | 1/2000 |
| WO | WO01/05086 * | 1/2001 |
| WO | WO 01/05086 A2 | 1/2001 |

OTHER PUBLICATIONS

*IPsec: NetOctave FlowThrough Security Architecture*, NetOctave brochure. Oct. 2001, pp. 1-3.
*Wire-Speed Network Security for IP Storage—Challenges and Solutions-*, NetOctave brochure. Oct. 2001, pp. 1-8.
*SSL Security—Design for System-Level Performance-*, NetOctave brochure. Nov. 2001, pp. 1-6.
Savarda, Ray. *Next Generation Network Security Processors: Optimal Design and Integration with Network Processors*, NetOctave brochure. Oct. 2001, pp. 1-9.
*NSP3000B-IPsec Security Processor Card*, NetOctave Product Brief. Aug. 2001.
*NSP3002B-IPsec Security Processor Card*, NetOctave Product Brief. Aug. 2001.
*NSP3004B-IPsec Security Processor Card*, NetOctave Product Brief. Aug. 2001.
*NSP2000B-SSL Security Processor Card*, NetOctave Product Brief. Aug. 2001.
*NSP2002B-SSL Security Processor Card*, NetOctave Product Brief. Aug. 2001.
*NSP2004-SSL Security Processor Card*, NetOctave Product Brief. Aug. 2001.
Murhammer et al. *TCP/IP Tutorial and Technical Overview*. International Technical Support Organization, Oct. 1998, pp. 1-719.
Kent et al. *IP Encapsulating Security Payload (ESP)*. Nov. 1998, pp. 1-21.
Kent et al. *IP Authentication Header*. Nov. 1998, pp. 1-21.
Perkins, C. *IP Mobility Support for IPv4*. Jan. 2002, pp. 1-92.
Shachem et al. *IP Payload Compression Protocol (IPComp)*. Sep. 2001, pp. 1-13.
Harkins et al. *The Internet Key Exchange (IKE)*. Nov. 1998, pp. 1-39.
*Internet Protocol: DARPA Internet Program Protocol Specification*. Sep. 1981, pp. 1-49.
Perkins, C. *IP Encapsulation Within IP*. Oct. 1996, pp. 1-14.
Perkins, C. *Minimal Encapsulation Within IP*. Oct. 1996, pp. 1-6.
Maughan, D. *Internet Security Association and Key Management Protocol (ISAKMP)*. Nov. 1998, pp. 1-81.
*NetOctave Announces FlowThrough™ Security Architecture*, News Release. San Jose, CA, Oct. 15, 2001.
International Search Report for PCT/US01/48207, May 15, 2003.
Kent et al. *Security Architecture for the Internet Protocol*. Nov. 1998, pp. 1-66.
Hifn 6500 Public Key Processor. http://www.hifn.com/products/6500.html, printed Apr. 29, 2001.
FastMap Integrated Circuit. Rainbow Technologies Internet Security Group. Oct. 1, 1998.
Preuss, Lisa. "Rainbow Technologies Announces OEM Availability of FastMap High Performance Public Key Integrated Circuit Processor," News Release. Atlanta, GA, Oct. 21, 1998.
SafeNet: OEM Solutions. www.safenet-inc.com/technology/chips/Chip2141.asp, printed Apr. 29, 2001.
Suchmann, David. *Electronic Products: Novel Approach to Chip Design Improves SSL Encryption*. Sep. 3, 2001.
*NetOctave Announces SSL and IPSec Security Accelerator Boards*. News Release, Sep. 11, 2001.
*Next-generation Applications Need IPSec Security: NetOctave IPSec Solutions*. Brochure, Mar. 2001.
*Next-generation Applications Need SSL Security: NetOctave SSL Solutions*. Brochure, Mar. 2001.
Werner Bux et al. "Technologies and Building Blocks for Fast Packet Forwarding" *IEEE Communications Magazine*, IEEE Service Center, Piscataway, US, vol. 39, No. 1, (Jan. 1, 2001) pp. 70-77, XP011091407, ISSN: 0163-6804.

* cited by examiner

| SEn (31) | Rsvd (30:26) | Flow ID (25:16) | Rsvd (15:10) | PFSN (9:0) |
|---|---|---|---|---|
| Flags (63:32) | | | | |
| Flags (31:0) | | | | |
| Version (31:29) | Rsvd (28:26) | MdLenAdd (25:21) | Header Length (20:16) | PO Length (15:0) |
| MTU (31:18) | | | SAD Index (17:0) | |
| Rsvd (31:29) | SPD Index (28:16) | | Rsvd (15:8) | Port Selector (7:0) |
| User Bytes (31:0) [0-25 words per packet object] | | | | |

Figure 5A

| SEn (31) | Rsvd (30:26) | Flow ID (25:16) | Rsvd (15:10) | PFSN (9:0) |
|---|---|---|---|---|
| Flags (63:32) | | | | |
| Flags (31:0) | | | | |
| Version (31:29) | Rsvd (28:26) | MdLenAdd (25:21) | Header Length (20:16) | PO Length (15:0) |
| MTU (31:18) | | | SAD Index (17:0) | |
| IPsec Protocol (31:24) | IPsec Pad Len (23:16) | | Rsvd (15:8) | Port Selector (7:0) |
| Transfer Record 0 (31:16) | | | Transfer Record 1 (15:0) | |
| Transfer Record 2 (31:16) | | | Transfer Record 3 (15:0) | |
| Transfer Record 4 (31:16) | | | Transfer Record 5 (15:0) | |
| Transfer Record 6 (31:16) | | | Transfer Record 7 (15:0) | |

METHODS, SYSTEMS AND COMPUTER PROGRAM PRODUCTS FOR PACKET ORDERING FOR PARALLEL PACKET TRANSFORM PROCESSING

FIELD OF THE INVENTION

The present invention relates to cryptographic processing, and more particularly, to cryptographic processing using parallel cryptographic processors.

BACKGROUND OF THE INVENTION

With increased use of the Internet to transmit secure information, such as credit card information in an e-commerce transaction, banking information for online banking applications, stock trading information or the like, concerns over security have become more prevalent. Similarly, the Internet has seen an increase in the use of Virtual Private Networks, which utilize the Internet as a communications media but impose security protocols onto the Internet to provide secure communications between network hosts. Typically, these security protocols are intended to provide "end-to-end" security in that secure communications are provided for the entire communications path between two host processing systems.

To address these and other issues, the Internet Protocol Security Architecture (IPsec) was developed. IPsec is a Virtual Private Network (VPN) technology. Typically, IPsec uses symmetric keys to secure traffic between peers. These symmetric keys are generated and distributed by an Internet Key Exchange (IKE) function. IPsec uses security associations (SAs) to provide security services to traffic. SAs are unidirectional logical connections between two IPsec systems which may be uniquely identified by the triplet of <Security Parameter Index, IP Destination Address, Security Protocol>. To provide bidirectional communications, typically, two SAs are defined, one in each direction.

SAs are managed by IPsec systems maintaining two databases: a Security Policy Database (SPD) and a Security Associations Database (SAD). The SPD specifies what security services are to be offered to the IP traffic. Typically, the SPD contains an ordered list of policy entries which are separate for inbound and outbound traffic. These policies may specify, for example, that some traffic must not go through IPsec processing, some traffic must be discarded and some traffic must be IPsec processed.

The SAD contains parameter information about each SA. Such parameters may include the security protocol algorithms and keys for Authentication Header (AH) or Encapsulating Security Payload (ESP) security protocols, sequence numbers, protocol mode and SA lifetime. With IPsec in place, for outbound packets, the SPD is consulted to determine if IPsec processing is required or if other processing or discarding of the packet is to be performed. If IPsec is required, the outbound SAD is searched for an existing SA for which the packet matches the profile. If a SA is found or after negotiation of a SA, IPsec is applied to the packet as defined by the SA and the packet is delivered. For inbound packets, the inbound SAD can be directly consulted to determine if IPsec or other processing is required. If IPsec is required, the SAD is searched for an existing security parameter index to match the security parameter index of the inbound packet. The SA is then used to IPsec process the inbound packet. A final check against inbound policy is made after inbound processing to verify the validity of the resulting packet.

As is evident from the above discussion, a significant amount of processor resources may be devoted to security processing. Both IPsec processing and Secure Socket Layer (SSL) processing may, for example, require encryption and decryption of data as well as application of security policies to that data. Such security processing may adversely affect throughput of communications. For example, security processing may reduce the number of transactions an online banking system may receive in a given period of time. Similarly, throughput concerns may become an issue in "real time" applications of the Internet, such as the transmission of video or audio over the Internet. Thus, it may be beneficial to provide dedicated processing capabilities to perform the complex tasks associated with encryption, which may improve the performance Internet security processing and, thereby, improve throughput.

One further difficulty with particular types of Internet traffic relates to the sequence or order in which packets are received. For example, in typical Internet traffic, packets may be transmitted and received out or order and then re-ordered at the receiving endpoint. In the current Internet Protocol (IP) standard, this reordering is allowed at the IP layer, and the end-units would re-order the packets if necessary before passing data to the application layer. However, recent introductions of voice and video data over the IP network have increased the importance that packets are not reordered in the network. The latency and overhead required to re-order the packets at the end stations may not be acceptable in these real-time applications, and may frequently result in dropped packets.

In order to improve cryptographic performance, aggregation may be utilized in the architecture of a cryptographic accelerator. Through the use of parallel processing techniques, increased processing performance may be achieved. However, in conventional parallel processing of cryptographic packets, packets of different lengths or requiring different processing within the crypto units may take different amounts of time to be processed. Thus, packets may be reordered when traversing the parallel cryptographic system. For instance, if a sequence of packets of sizes 3x, 2x and x are provided to parallel cryptographic processing units at the same time they will finish in order x, 2x and 3x (assuming that the transformations required for each packet and the processing performance of the crypto units is similar). If these packets are simply output in the order in which processing is completed, the packets will have been re-ordered. Thus, conventional aggregation techniques for parallel processing may be unsuitable for use in cryptographic processing.

SUMMARY OF THE INVENTION

Embodiments of the present invention provide methods, systems and computer program products for processing packets while maintaining a sequence of the cryptographic packets. Packets are received and a sequence identifier assigned to the packets. The sequence identifier specifies a serial order associated with the packet. The packets are provided to a plurality of parallel packet transform processors and the packets are processed utilizing the packet transform processors. The processed packets are ordered based on the sequence identifier of the packets. In further embodiments of the present invention, packets are evaluated to classify the packets so as to identify related packets. A sequence identifier is assigned to the packets such that the sequence identifier identifies an ordering of the related packets. The processed packets are ordered based on the classification of the packets and the sequence identifier of the packets.

In still further embodiments of the present invention, a flow identifier is assigned to related packets based on the evaluation of the packets. In such as case, the evaluation of the packets may include evaluating a source address, a destination address and a protocol associated with the packets. A flow identifier may be assigned to related packets based on the source address, destination address and protocol associated with the packets.

In additional embodiments of the present invention, the packets are evaluated by evaluating a destination address, a security parameter index and a protocol associated with the packets. In such embodiments, a flow identifier is assigned to related packets by assigning a flow identifier to related packets based on the destination address, security parameter index and protocol associated with the packets.

In yet additional embodiments of the present invention, the packets are cryptographic packets and the flow identifier of related packets is generated based on information contained in the related packets. In such embodiments, it may be determined if the packet is a packet of an encrypting flow. If so, the flow identifier may be generated by hashing a source address, a destination address and a protocol contained in the packets. Similarly, it may be determined if the packet is a packet of a decrypting flow. If so, the flow identifier may be generated by hashing a destination address, a security parameter index and a protocol contained in the packets.

In further embodiments of the present invention, the flow identifier is generated by hashing fields of a packet. In such embodiments, the fields of the packet are multiplied by respective prime numbers to provide multiplied values, the multiplied values are summed so as to provide a sum and the modulo of the largest prime number not greater than $2^n$ and the sum determined, where n is the number of bits in the resulting flow identifier.

In additional embodiments of the present invention, the processed packets are ordered based on the classification of the packets and the sequence identifier of the packets by controlling timing of an output of each of the parallel packet transform processors processing a related packet based on an output sequence value associated with the related packets so as to admit outputs of the parallel packet transform processors processing related packets in a sequence corresponding to the ordering of the related packets. In such embodiments, the output timing may be controlled by maintaining a current output sequence value associated with the related packets, determining if an output packet of one of the parallel processors has a sequence identifier corresponding to the current output sequence value and allowing the parallel processor to output the output packet if the output packet has a sequence identifier corresponding to the current output sequence value.

Furthermore, the output of the parallel processors may further be controlled based on the flow identifier of a processed packet and a sequence identifier of a processed packet. In such a case, the output of the parallel processors may be controlled so as to assure that processed packets with different flow identifiers will have an opportunity to be output.

In still further embodiments of the present invention, the processing of packets in a cryptographic processing system having a plurality of parallel packet transform processors is controlled by assigning a flow identifier to related packets, assigning a sequence identifier to each packet of the related packets and encapsulating the packet, the flow identifier and the sequence identifier to provide a packet-object. The packet-object is provided to one of the packet transform processor of the parallel packet transform processors and processed utilizing the one of the packet transform processors to provide a processed packet-object. The processed packet-object is selectively output based on the flow identifier and the sequence identifier of the processed packet-object.

In additional embodiments of the present invention, a flow identifier is assigned by extracting selector values from a packet and hashing the selector values so as to provide the flow identifier. The extraction of the selector values may be provided by determining if the packet is an inbound cryptographic packet or an outbound cryptographic packet and extracting the source address, destination address and protocol from the packet if the packet is an outbound cryptographic packet or extracting the destination address, security parameter index and protocol from the packet if the packet is an inbound cryptographic packet.

In such embodiment, the selector values may be hashed to provide the flow identifier by multiplying the selector values by prime numbers, summing the results of the multiplication; and determining the modulo of the largest prime number not greater than $2^n$ of the results of the sum, where n is the number of bits in the flow identifier.

In still further embodiments of the present invention, a table of sequence identifiers associated with flow identifiers is maintained. A sequence identifier is assigned to each packet of the related packets by looking up a current sequence identifier in the table utilizing the flow identifier of the packet, assigning the current sequence identifier to the packet, incrementing the current sequence identifier to provide an updated current sequence identifier and storing the updated current sequence identifier in the table associated with the flow identifier of the packet.

Furthermore, the processed packet-object may be selectively output based on the flow identifier and the sequence identifier of the processed packet-object by determining if the sequence identifier of a processed packet-object corresponds to a current output sequence identifier for the flow identifier of the processed packet-object and outputting the processed packet-object if the current output sequence identifier for the flow identifier of the processed packet-object corresponds to the current output sequence identifier. Similarly, a table of current output sequence identifiers associated with flow identifiers may be maintained. Thus, the determination of whether the sequence identifier of a processed packet-object corresponds to a current output sequence identifier for the flow identifier of the processed packet-object may be provided by extracting the flow identifier and sequence identifier from a processed packet-object, looking up a current output sequence identifier in the table utilizing the flow identifier of the processed packet-object, and comparing the current output sequence identifier from the table with the sequence identifier extracted from the processed packet-object to determine if they are equal. The current output sequence identifier may be incremented to provide an updated current output sequence identifier if the current output sequence identifier and the extracted sequence identifier are equal and the updated current output sequence identifier stored in the table associated with the flow identifier of the processed packet-object.

Packet transformation systems according to particular embodiments of the present invention may include a plurality of packet transform processing units, a packet-input demux configured to receive a serial stream of packets, identify a sequence of the received packets and provide the packets to the plurality of packet transform processing units so as to allow parallel processing of the received packets and a packet-output mux configured to receive processed packets from the plurality of packet transform processing units and output the processed packets in the sequence identified by the packet-input demux. The packet-input demux and the packet-output mux may be further configured as described herein.

In particular embodiments of the present invention, the packet transform processors are cryptographic processors. In such embodiments, the packets may be cryptographic packets.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, and/or computer program products for parallel transformation processing of packets while maintaining relative packet order. Embodiments of the present invention will now be described with reference to FIGS. 1 through 7 which are flowchart, schematic and block diagram illustrations of operations of parallel cryptographic processing systems incorporating embodiments of the present invention. While embodiments of the present invention are described with reference to cryptographic processing, as will be appreciated by those of skill in the art, the present invention may be utilized with any type of parallel packet transformation. Thus, for example, parallel compression processing may also benefit from the teachings of the present invention. Accordingly, the present invention should not be construed as limited to cryptographic processing.

It will be understood that each block of the flowchart illustrations and/or block and/or schematic diagrams, and combinations of blocks in the flowchart illustrations and/or block and/or schematic diagrams, can be implemented by computer program instructions. These program instructions may be provided to a processor to produce a machine, such that the instructions which execute on the processor create means for implementing the functions specified in the flowchart and/or block and/or schematic diagram block or blocks. The computer program instructions may be executed by a processor to cause a series of operational steps to be performed by the processor to produce a computer implemented process such that the instructions which execute on the processor provide steps for implementing the functions specified in the flowchart and/or block and/or schematic diagram block or blocks.

Accordingly, blocks of the flowchart illustrations and/or block and/or schematic diagrams support combinations of means for performing the specified functions, combinations of steps for performing the specified functions and program instruction means for performing the specified functions. It will also be understood that each block of the flowchart illustrations and/or block and/or schematic diagrams, and combinations of blocks in the flowchart illustrations and/or block diagrams, can be implemented by special purpose hardware-based systems which perform the specified functions or steps, or combinations of special purpose hardware and computer instructions.

Figure 1:
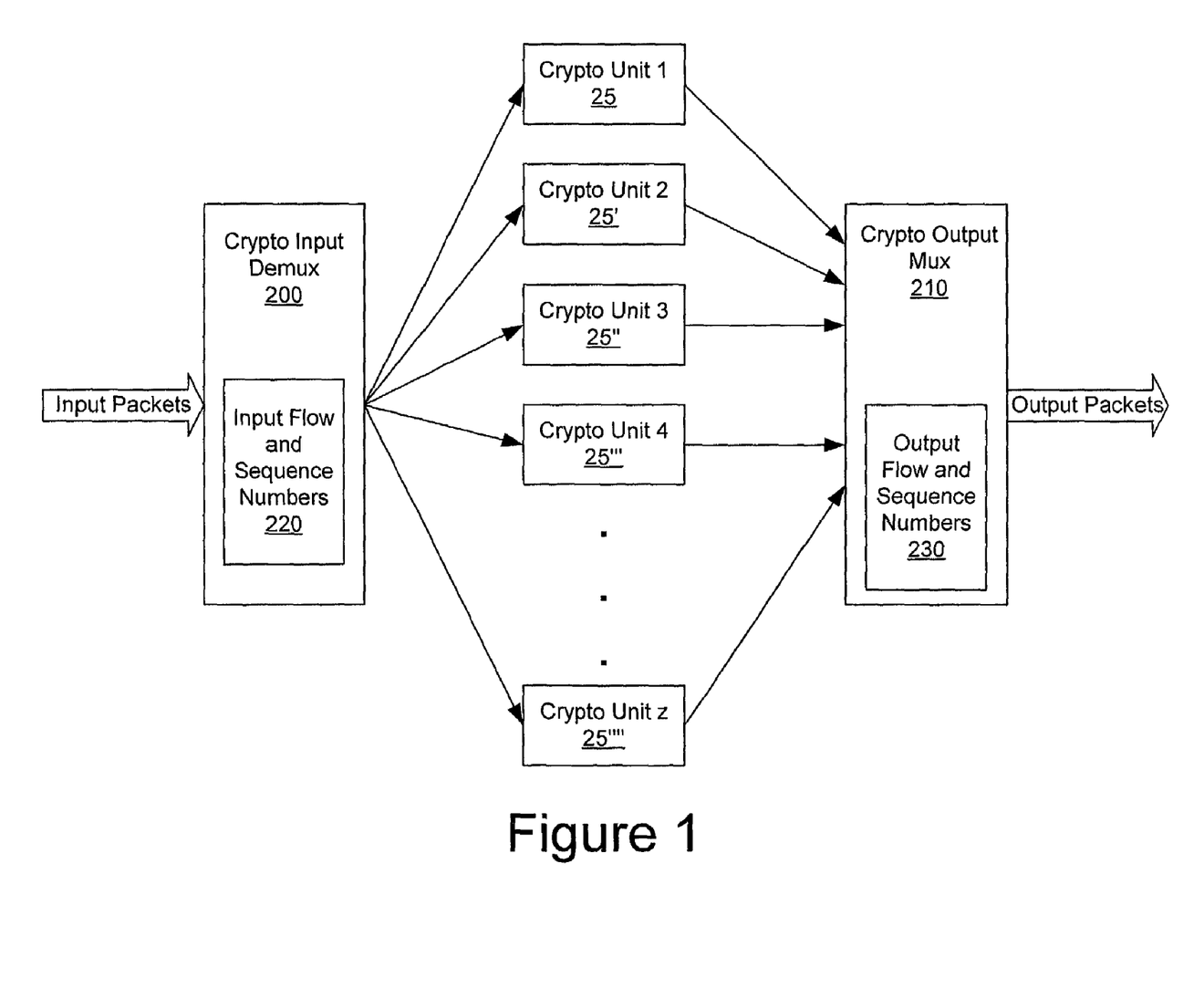
FIG. 1 is a block diagram of a parallel cryptographic processing system incorporating embodiments of the present invention.

FIG. 1 illustrates particular embodiments of the present invention which may be utilized for parallel cryptographic processing, such as encrypting and decrypting packets, such as IPsec or SSL packets. As seen in FIG. 1 a packet-input demutiliplexer (demux), illustrated as the crypto-demux 200, receives an input stream of cryptographic packets. The input stream of cryptographic packets may be packets which have not been previously processed (e.g., cleartext to ciphertext), referred to herein as outbound packets, or may be packets which have been previously processed (e.g., ciphertext to cleartext), referred to herein as inbound packets. As used herein, the term cryptographic packets is used to refer to inbound and/or outbound packets. The demux 200 receives the serial stream of packets and multiplexes them to a plurality of cryptographic processing units (crypto-units) 25, 25', 25", 25'" and 25"". The crypto-units 25, 25', 25", 25'" and 25"" may be any form of cryptographic processor capable of carrying out the operations described herein and may be all the same or may differ. For example, the crypto-units 25, 25', 25", 25'" and 25"" illustrated in FIG. 1 may have differing processing capabilities, may have differing processing speeds or may be multiple processors of the same type. Furthermore, while FIG. 1 illustrates cryptographic processing embodiments of the present invention, other packet transformation operations may also be performed in such a parallel system. Thus, the crypto-units 25, 25', 25", 25'" and 25"" illustrated in FIG. 1 may be replaced by other packet transform processors, such as compression processors or the like, in general which may be utilized in particular embodiments of the present invention.

Furthermore, the crypto-input demux 200 may provide the packets to the crypto-units 25, 25', 25", 25'" and 25"" on a round-robin basis, based on the processing characteristic of a particular one of the crypto-units 25, 25', 25", 25'" and 25"", to balance workload or based on other criteria for distribution of packets to the crypto-units 25, 25', 25", 25'" and 2"". After processing, the crypto-units 25, 25', 25", 25'" and 25"" provide the processed packets to the packet-output multiplexer (mux), illustrated as the crypto-output mux 210. The crypto-output mux 210 re-orders the packets from the crypto-units 25, 25', 25", 25'" and 25"" so as to provide output packets in a serial stream.

The crypto-input demux 200 also assigns a sequence identifier and maintains an identification of a current sequence identifier to assign to a next received packet. In particular embodiments of the present invention, sequence identifiers are assigned to related packets so as to define an order of the related packets. In the embodiments illustrated in FIG. 1, the related packets are identified as a "flow" such that an input flow identifier and a sequence number are associated with each received packet and the current sequence number for a given flow is maintained in the input flow and sequence number table 220. As described above, input packets may be characterized as either an inbound or outbound packet. Similarly, flows of inbound packets may be referred to as inbound flows and flows of outbound packets may be referred to as outbound flows.

The crypto-output mux 210 receives the processed packets from the crypto-units 25, 25', 25", 25'" and 25"" based on the sequence identifier of the processed packet. For embodiments of the present invention utilizing a flow identifier, as between packets from different flows, the crypto-output mux 210 may accept packets for output based on a round-robin distribution scheme, based on a fairness scheme or based on crypto history so as to assure that packets are not "stuck" in the crypto-units 25, 25', 25", 25'" and 2"". By accepting for output the packets in a sequence identifier order, the crypto-output mux 210 outputs the packets in sequence order and, thus, parallel processing of the packets may be accomplished while maintaining the sequence of the packets so that they do not require re-ordering.

The crypto-output mux 210 maintains a next sequence identifier in the sequence to compare the stored next sequence identifier with a sequence identifier of a processed packet to determine if the processed packet is the next packet in the sequence of packets. In particular embodiments of the present invention where sequence identifiers are assigned to related packets to define an order of the related packets, a sequence identifier is defined for each of the different related packets. In the embodiments illustrated in FIG. 1, the related packets are identified as a flow such that a flow identifier and a sequence number are associated with each received packet. In such embodiments, the crypto-output mux 210 maintains the next sequence number for a given flow in the output flow and sequence number table 230.

Figure 2:
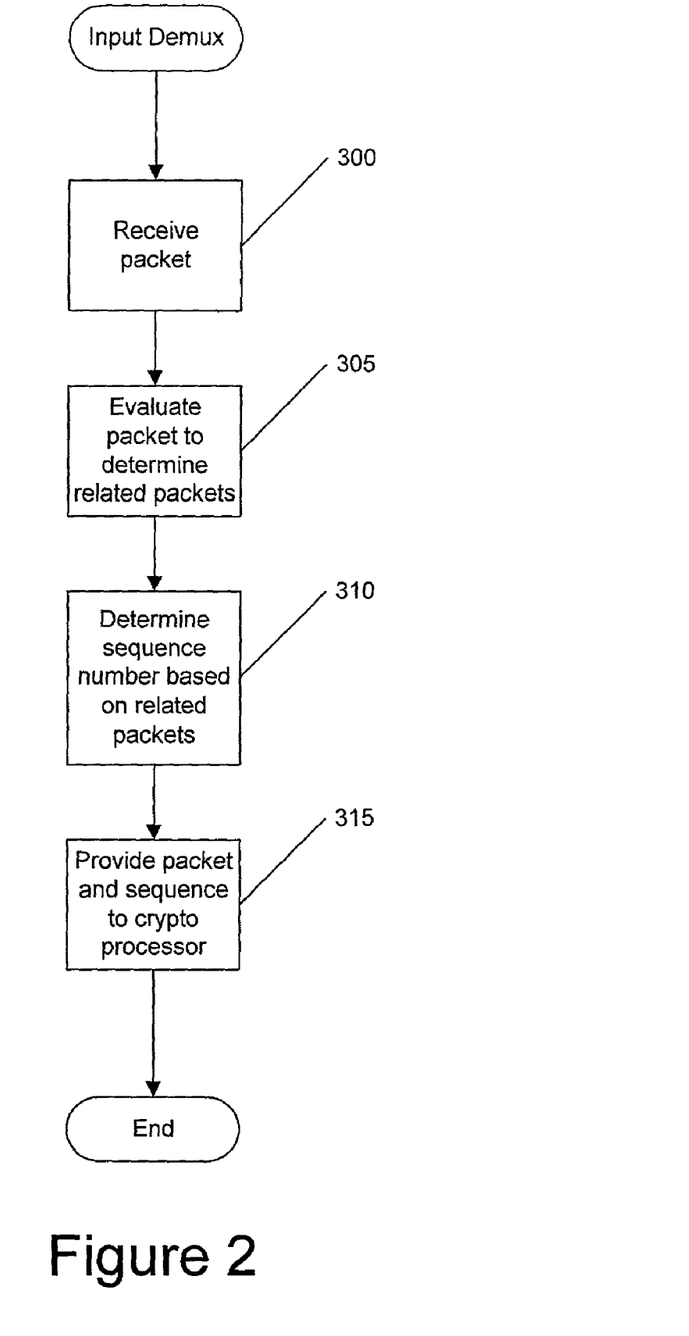
FIG. 2 is a flowchart of operations for demultiplexing and ordering packets according to embodiments of the present invention.
Figure 3:
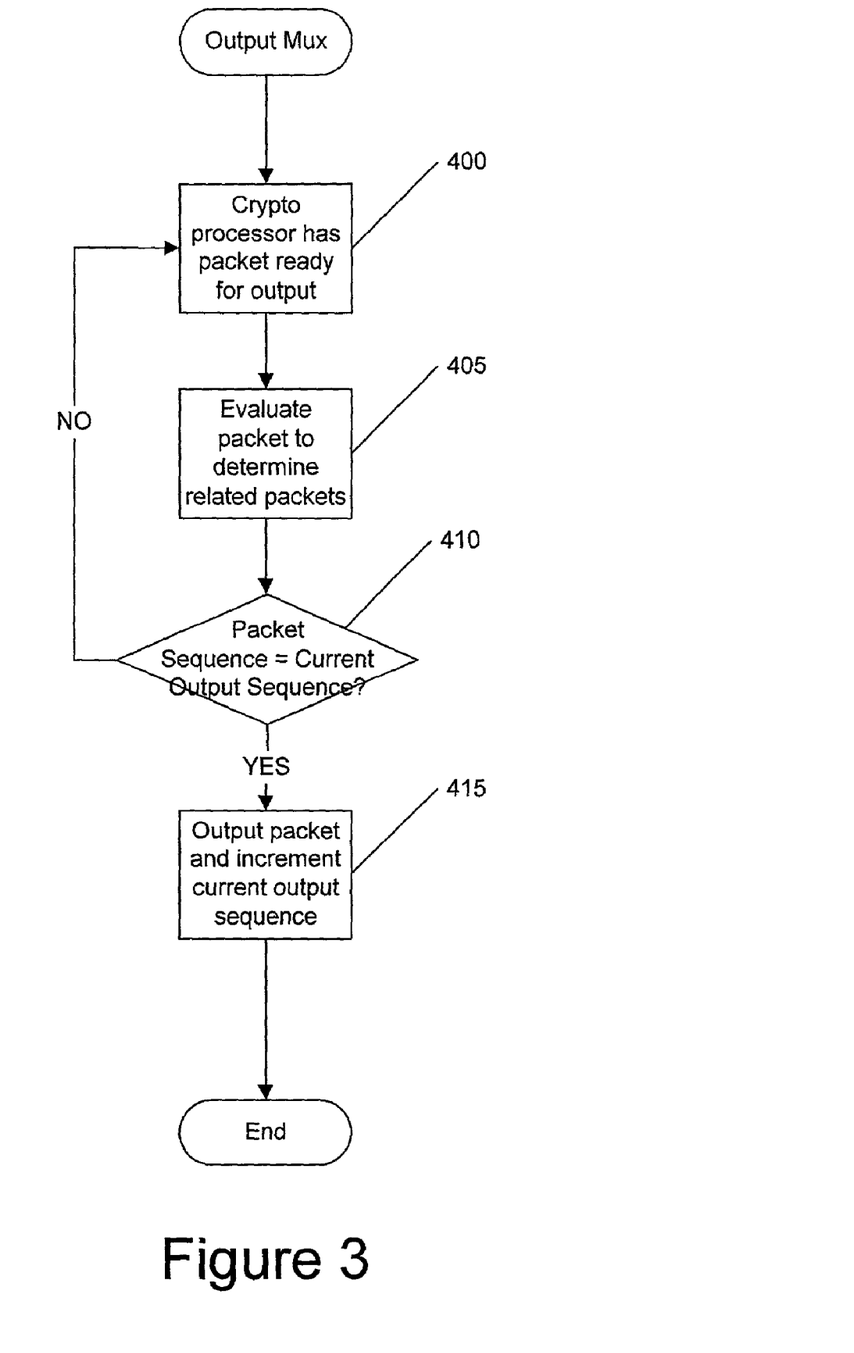
FIG. 3 is a flowchart illustrating operations for multiplexing processed packets from parallel cryptographic processing units according to embodiments of the present invention.

Operations of the parallel cryptographic system of FIG. 1 will now be described with reference to FIGS. 2 and 3, which are flowchart illustrations of operations of the crypto-input demux 200 and the crypto-output mux 210, respectively. As seen in FIG. 2, The crypto-input demux 200 receives a cryptographic packet (block 300) and evaluates the packet to determine related packets (block 305). Such an evaluation may be performed, for example, by evaluating the source and/or destination IP addresses, the security protocol, an IPsec SPI or other such information contained in the packet, such as the TCP and/or UDP source and/or destination port or the like. In any event, packets which are related to each other are identified and a sequence identifier determined based on the related packets so as to identify the place in the order of the related packets of the received packet (block 310). The packet and the sequence identifier are provided to one of the crypto-units 25, 25', 25", 25'" and 25"" (block 315).

The crypto-units 25, 25', 25", 25'" and 25"" process the packets and provide a processed packet. FIG. 3 illustrates operations of the crypto-output mux 210 when a processed packet is available from one of the crypto-units 25, 25', 25", 25'" and 25"". As seen in FIG. 3, the crypto-output mux 210 determines that one of the crypto-units 25, 25', 25", 25'" and 25"" has a processed packet ready for output (block 400). The crypto-output mux 210 evaluates the processed packet to determine if there are related packets (block 405) and determines if the sequence identifier for the processed packet is the next sequence identifier to be output for the related packets (block 410). If the sequence identifier for the processed packet is the next sequence identifier to be output for the related packets (block 410), the processed packet is output and the next sequence identifier for the related packets is incremented (block 415). If the sequence identifier for the processed packet is not the next sequence identifier to be output for the related packets (block 410), the crypto-output mux 210 waits for another processed packet to be ready for output. These operations continue until the sequence identifier of the processed packet is reached and the packet is output.

As described above, cryptographic packets may be evaluated to determine if the packets are related to previously received cryptographic packets so that the sequence of the related packets may be maintained even if processing times of the crypto-units the packets are assigned to differ.

Figure 4:
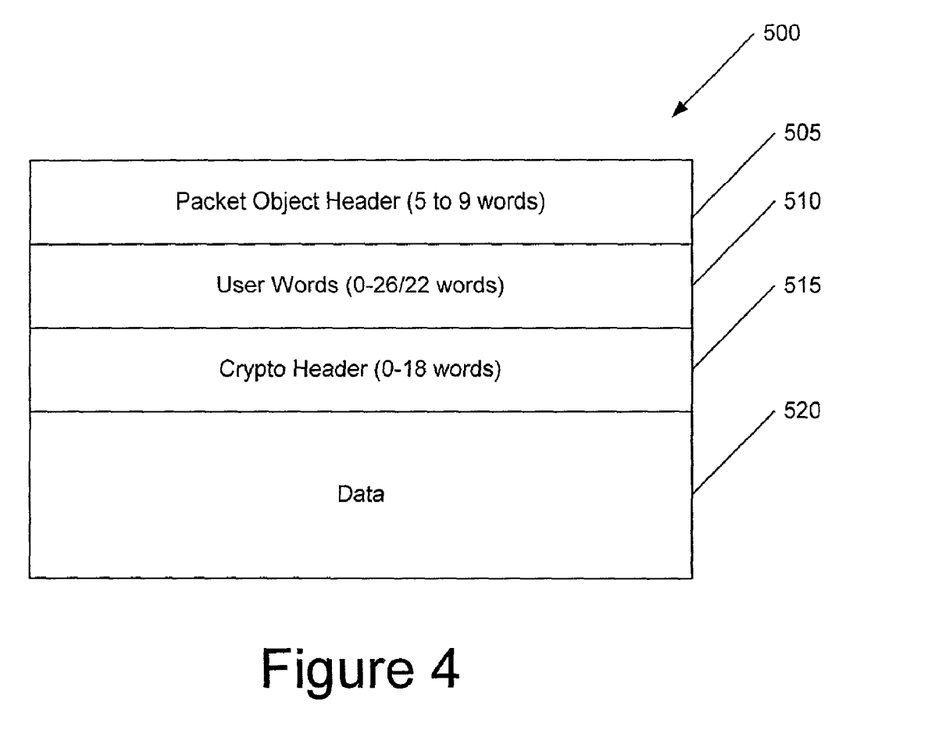
FIG. 4 is a block diagram of a packet object according to embodiments of the present invention.

Particular embodiments of the present invention will now be described with reference to FIGS. 4 through 8. As discussed above, in the development of high-speed Internet Protocol (IP) based cryptographic systems, it may be beneficial to arrange cryptographic transform engines (e.g. crypto-units) in parallel to allow system cryptographic performance scaling through aggregation. Through the use of aggregation, individual crypto-units, which may be constrained in performance by the current limits of silicon technology (both gate speed and density), can be aggregated to provide many times their original performance. In particular embodiments of the present invention, parallel processing may be furthered through the encapsulation of an IP packet with its associated context information. Such an encapsulation is illustrated in FIG. 4. As seen in FIG. 4, a packet object 500 includes a Packet-Object header 505, which is followed by user words 510, a crypto header 515 and data 520 containing the actual IP packet itself. The packet-object traverses a pipelined hardware architecture, which may provide parallelism in the sequential operations required to be performed on the core IP packet in order to implement packet transformations required by standard security protocols such as IPsec or SSL. Utilizing such a packet-object, the individual crypto-units 25, 25', 25", 25''' and 25'''' of performance Y (bits/Sec, Transforms/Sec) can be aggregated to provide composite throughput approaching Y×Z (bits/sec, Transforms/Sec) where Z is the number of aggregated units.

Figure 6A:
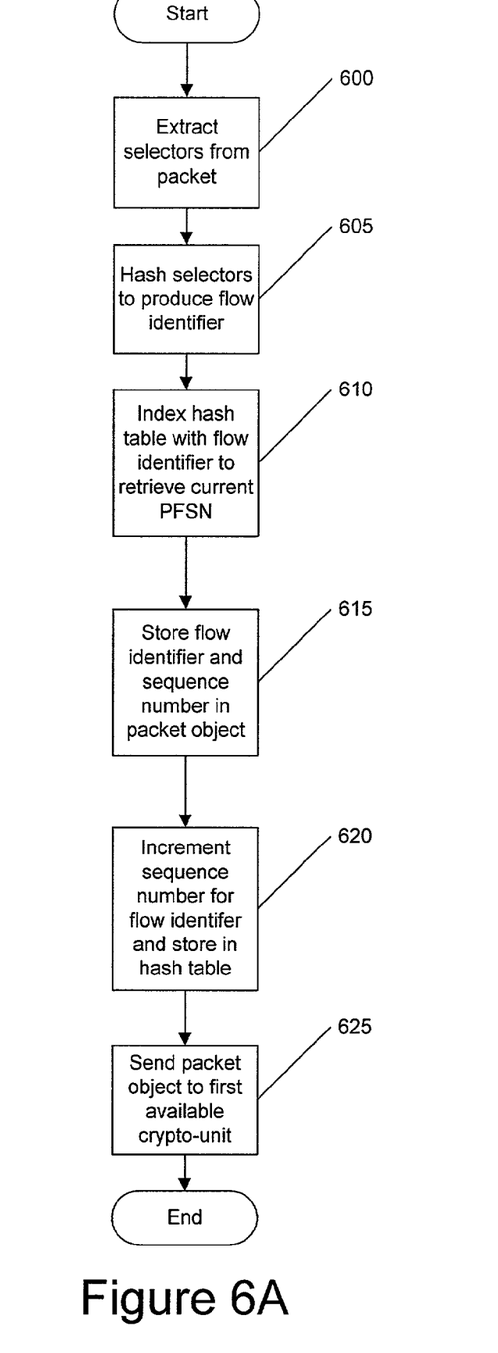
FIGS. 6A and 6B are flowchart illustrations of operations of a crypto-input demux and a crypto-output mux according to embodiments of the present invention.
Figure 6B:
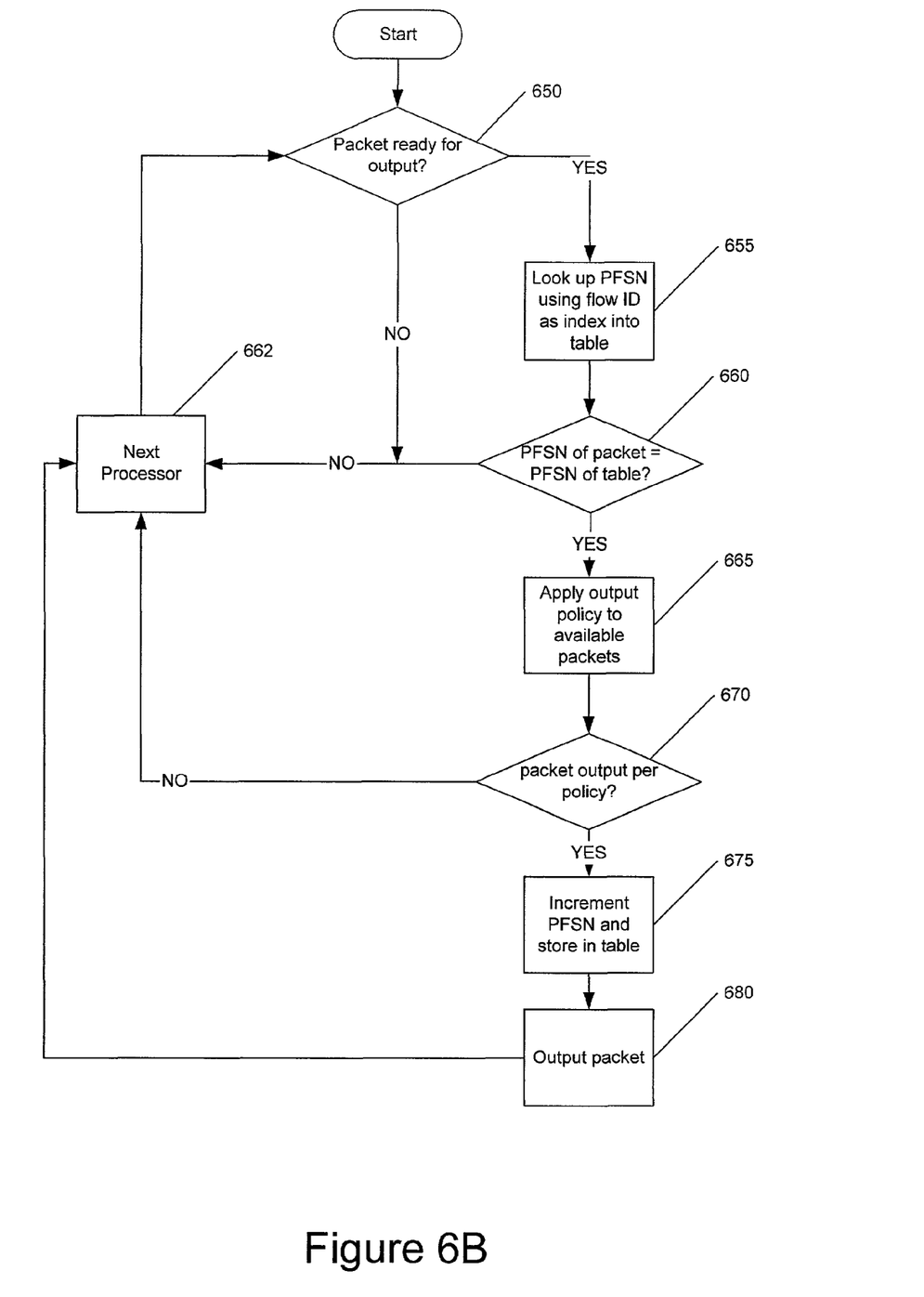

Certain embodiments of the present invention may reduce or minimize latency, required gate count in digital logic, and memory requirements over conventional techniques. In particular, embodiments of the present invention may provide packet object classification, per-flow packet-object numbering, and packet-object output admission. Such operations are illustrated in FIGS. 6A and 6B.

In the embodiments illustrated in FIGS. 5A, 5B, 6A and 6B, a flow is classified based on selected fields of a packet. For an outbound flow or encrypting flow, the selected fields (selectors) are source IP address (32 bits), destination IP Address (32 bits) and protocol (8 bits). For an inbound flow or decrypting flow the selector fields are destination IP address (32 bits), SPI (IPsec Security Parameter Index, 32 bits) and protocol (8 bits). In other embodiments of the present invention, more of fewer fields from the given packet-object can be used to classify flows.

Classification is performed in the crypto-input demux 200. Operations for classification and per-flow sequence number assignment are illustrated in FIG. 6A. As is seen in FIG. 6A, for each packet-object entering the crypto-input demux 200, the selectors for flow classification will be extracted from the packet-object (block 600). The selectors are hashed to produce a hash result which is utilized as a flow identifier (block 605). The flow identifier is used to index into the input flow and sequence number table 220 to retrieve the current per flow sequence number (PFSN) for the flow corresponding to the flow identifier (block 610). The flow identifier and the PFSN are stored in a field(s) in the packet-object (block 615) and the PFSN is incremented and stored back to the input flow and sequence number table 220 (block 620). The packet-object is routed to the first available crypto-unit 25, 25', 25", 25''' and 25'''' (block 625).

As described above, the flow identifier may be generated by hashing the selectors from a packet. This classification may be performed utilizing differing hash functions based on whether the packet is an inbound packet or an outbound packet. Thus, the following hash operations may be carried out:

Hash outbound=($Src$*383+$Dst$*257+Protocol*7919) %$M$

Hash inbound=($SPI$*383+$Dst$*257+Protocol*7919) %$M$

Where M is the largest prime number not greater than $2^M$ and M is the number of bits in the flow identifier. Thus, M=1021 for a 10 bit hash result, 2039 for an 11 bit hash result, or 4093 for a 12 bit hash result, Src is the source IP address and Dst is the destination IP address.

Preferably, the hashing operations are divided into a sequence of operations which may reduce the number of bits required at a particular stage of the operations. Thus, utilizing the associative properties of modulo arithmetic, the modulo, multiplication and summing operations may be divided such that the # of bits of the multipliers and adders may be reduced. For example, the modulo M of the Src, the Dst and the Protocol may be determined and then multiplied by the prime numbers and then summed. Thus, the number of bits required for a multiplication is the number of bits needed for the multiplication of the modulo result rather than the original value.

The values 383, 257, 7,919 are all prime numbers (they also can all be expressed as 2 or 3 signed partial products, which may simplify implementation). Therefore, all of these numbers are mutually prime. This means that the different components of the key will only be congruent modulo M for integer multiples of their least common multiple. Because they are all prime numbers, they are all odd, and are mutually prime with powers of 2. Therefore, masking off the upper bits of the hash for smaller table sizes, which is mathematically finding hash % $2^n$, is simply another relatively prime modulus, and preserves the spreading of the hash values. As will be appreciated by those of skill in the art, other hash functions as well as modifications to the above hash functions may be utilized while still benefiting from the teachings of the present invention.

These hash values are used as the flow identifiers for the purposes of classification. It is possible that multiple flows may hash to the same value. With $2^{72}$ different total possible flows, and only $2^{10}$ actual flows differentiated through the hash function, it may be inevitable that there will be collisions. However, the effect of this may result in only a slight inefficiency at the system level, as packets will be ordered through the system which are not of the same flow. The relative order of the packets output will still be the same as the relative order in which they are received. The likelihood of collisions resulting in different flows using the same sequence identifiers, given the scope of the number of flows actually present in the cryptographic system at any time, will be low enough that it may be insignificant. However, if embodiments of the present invention are utilized in environments where there is not a large range of selector values, it may be necessary to use larger hash lengths (in bits) to decrease the number of collisions. Using larger hash length, however, results in larger sequence number tables.

As described above, for each identified flow, a sequence number, the per-flow sequence number (PFSN), is maintained which identifies packet sequencing for that flow. For each flow, the PFSN is initialized to 0, and then for each packet identified per flow, the sequence number will be applied to that packet and then incremented. The PFSN may wrap around when the largest value has been reached and return to 0. The updated PFSN may be stored in the table input flow and sequence number table 220 in the crypto-input demux 200 and indexed utilizing the flow identifier. The size in bits of the PFSN may be twice the maximum number of packets possibly in transit within the aggregate of all the instantiated crypto-units between the crypto-input demux 200 and the crypto-output mux 210. Such a size may allow the PFSN counter to wrap around without overlap in the PFSN of any packets that might still be in the crypto-units.

Figure 5A:
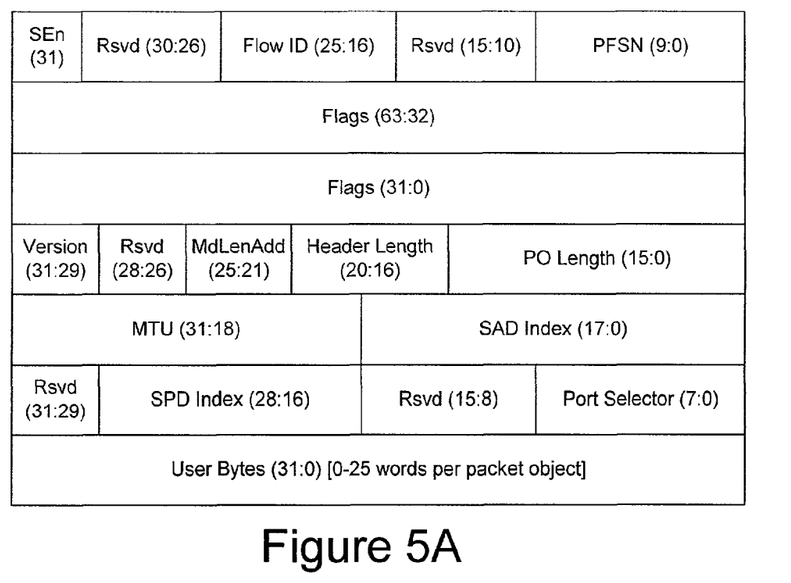
FIGS. 5A and 5B are block diagrams of packet objects for outbound cryptographic packets and inbound cryptographic packets respectively, according to embodiments of the present invention.
Figure 5B:
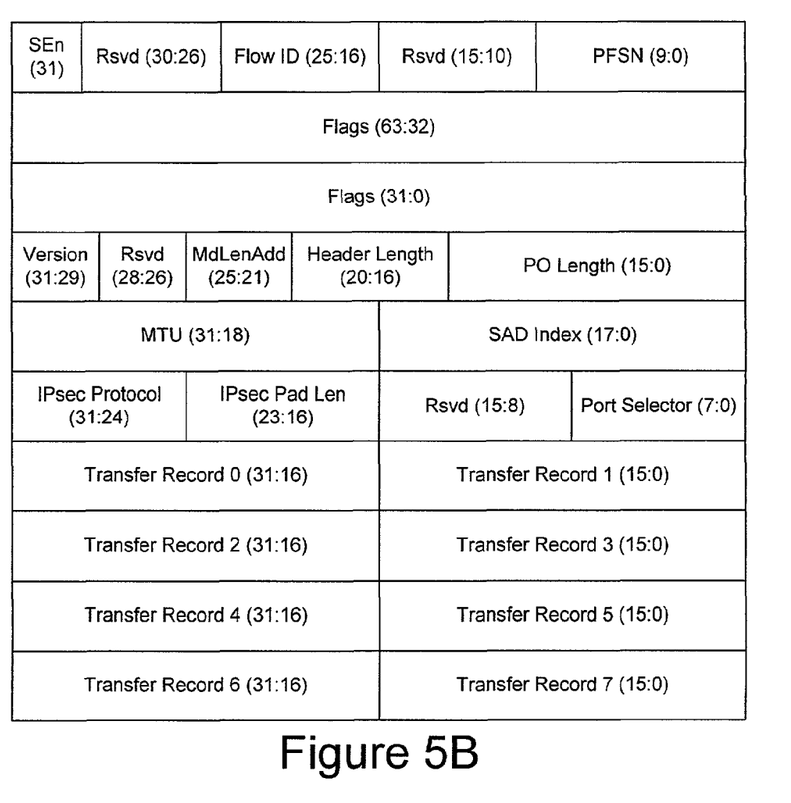

For the purposes of preserving the sequencing of the packets through the crypto-units, the flow identification and PFSN are pre-pended to the packet-object of FIG. 4 without altering any of the other fields of the packet-object. This placement allows the values for flow identification and PFSN to be passed in-band between the crypto-input demux 200 and the crypto-units 25, 25', 25", 25''' and 25'''', and then between the crypto-units 25, 25', 25", 25''' and 25'''' and the crypto-output mux 210. Examples of the packet-object for inbound packets is illustrated in FIG. 5A and for outbound packets is illustrated in FIG. 5B. In the packet-objects illustrated in FIGS. 5A and 5B, the SEn bit is a flag which tells the crypto-output mux 210 to disregard ordering for this packet. Such a flag may be set by the crypto-input demux 200 based on an evaluation of the contents of a packet, quality of service information associated with the packet or the like, such that packets which do not require ordering can be passed through the parallel processing system without requiring strict ordering in the packets. A separate PFSN counter can be used for such non-ordered packets, to simplify the logic in the crypto-output mux 210 such that if the SEn flag is set, the PFSN could be compared as with other flows, and to ensure that the oldest unordered packet will be given priority at the crypto-output mux 210. Alternatively, a fixed PFSN value, such as a value between the largest prime number not greater than $2^n$ and $2^n$, could be utilized such that packets which do not require ordering can be output as soon as they are available.

FIG. 6B illustrates operations for packet output according to round-robin embodiments of the present invention. As seen in FIG. 6B, the crypto-units 25, 25', 25", 25'" and 25"" may be serially interrogated to determine if a packet-object is ready for output (block 650). If so, the crypto-output mux 210 uses the flow ID of the packet-object to look up a current output PFSN for the flow in its output flow and sequence numbers table 230 (block 655). If the PFSN of the packet-object is not equal to the PFSN determined by the crypto-output mux 210 (block 660), the packet-object is not output and the next one of the crypto-units 25, 25', 25", 25'" and 25"" in the round-robin sequence (block 662) is evaluated to determine if a packet-object is ready for output (block 650).

If the PFSN of the packet-object is equal to the current output PFSN for the flow ID of the packet-object (block 660), output policies are applied to the available packet objects (block 665). Such output policies may, for example, be a round robin selection of packet-objects available for output or may be other output admission schemes, such as an output admission policy based on fairness, duration between output admission for a processor, deadlines associated with a flow or packet or other such output admission policies known to those of skill in the art. If the output policy does not specify that the packet-object is to be output (block 670), then the next one of the crypto-units 25, 25', 25", 25'" and 25"" in the round-robin sequence (block 662) is evaluated to determine if a packet-object is ready for output (block 650) and operations continue. If the output policy specifies that the packet-object is to be output (block 670), the PFSN for the flow ID of the packet-object is incremented and stored in the output flow and sequence numbers table 230 by the crypto-output mux 210 (block 675) and the packet-object is output (block 680). The next one of the crypto-units 25, 25', 25", 25'" and 25"" in the round-robin sequence (block 662) is evaluated to determine if a packet-object is ready for output (block 650). These operations may continue for as long as packet-objects are made available by the crypto-units 25, 25', 25", 25'" and 25"" for output.

As discussed above, the size in bits of the PFSN may be twice the maximum number of packets possibly in transit within the aggregate of all the instantiated crypto-units between the input demux and the output mux. For the initial assumption that there is only 1 packet in an input buffer and 1 packet in an output buffer of each crypto-unit, the total number of packets in transit for a 5 crypto-unit system is a fairly small number (e.g. 10). However, if a large packet goes into crypto unit #1, and then 4 small packets go into crypto-units #2-5, and they are all dependent on the packet in crypto-unit #1 finishing, then the processing elements in crypto-units #2-5 will finish their packet transforms and then go idle until the large packet in crypto-unit #1 finishes and is output. This may result a significant amount of inefficiency within the pipeline.

To avoid such a bottle-neck in the pipeline, multiple packets could be allowed into the output buffer of each crypto-unit 25, 25', 25", 25'" and 25"". For small to medium sized packets in the face of non-optimal ordering sequencing, this could allow significant efficiency gains, especially if a much greater bus bandwidth is available between the crypto-units 25, 25', 25", 25'" and 25"" and the output bus then is available at the input bus. If additional packet-objects are allowed in the output buffers of the crypto-units 25, 25', 25", 25'" and 25"", larger sequence numbers may be needed to prevent rollover of the sequence number while the packets might still be in the pipeline. However, for typical operations, a 10 bit sequence number may be acceptable. For example, a large packet may have about 9K bytes or about 196 packets of 46 bytes. Thus, four parallel crypto-units might hold about 200*4=800 packets (ignoring bus transfer time and the fact that smaller packets are typically processed more slowly in the crypto-units bit-for-bit than larger packets, and that different packets have different processing times based on the required processing (ESP/AES128 only vs ESP AES256+MD5). If, to take into account these inefficiencies, the maximum number of packets is scaled back to 500 packets, then twice the maximum number is 1000 packets. In such a case, a 10 bit sequence number may be sufficient.

Figure 7:
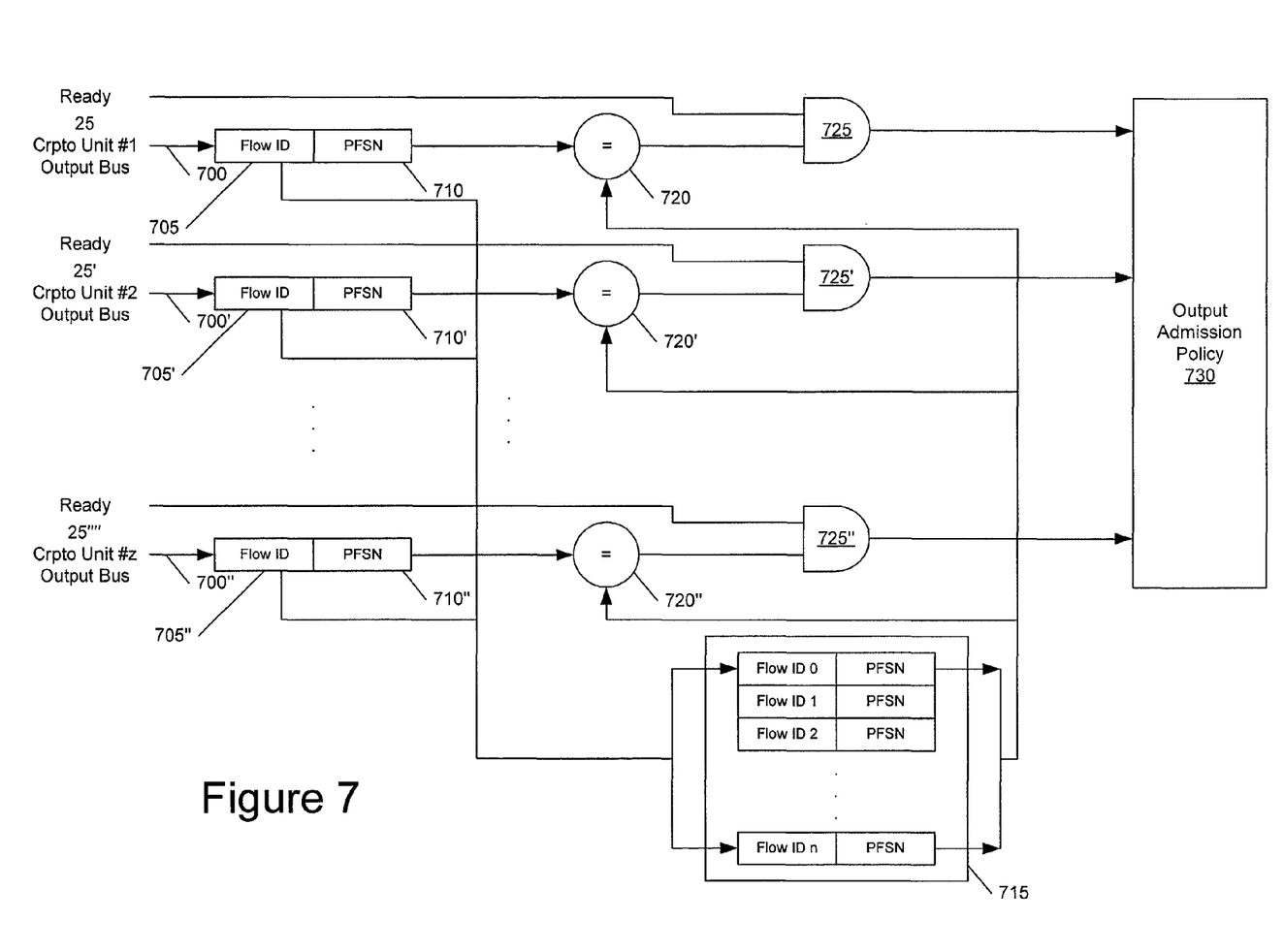
FIG. 7 is a schematic diagram of the output selection logic for re-ordering packets according to embodiments of the present invention.

FIG. 7 illustrates a particular implementation of the output determination for a cryptographic system according to embodiments of the present invention. In particular, FIG. 7 illustrates output admission logic of the crypto-output mux 210. The crypto-units 25, 25', 25", 25'" and 25"" of FIG. 1 perform the cryptographic processing specified by the packet-object and, when such processing is complete, place the processed packet object on output buses 700, 700' and 700" of FIG. 7 to the crypto-output mux 210 of FIG. 1. Each crypto-unit 25, 25', 25", 25'" and 25"" need only pass the first word, which contains the Flow ID 705, 705' and 705" and the PFSN 710, 710' and 710", of every packet-object directly to its output bus. When a crypto-unit 25, 25', 25", 25'" and 25"" finishes processing the packet-object, it signals this to the crypto-output mux 210 utilizing the Ready signal. The crypto-output mux 210, evaluates the available ready packet-objects and determines which to pass through to the output bus.

The crypto-output mux 210 maintains a PFSN table 715 much like the input demux table 220, but in this case for a given flow ID the crypto-output mux 210 references the table using the flow ID 705, 705' and 705" on the output bus 700, 700' and 700" and compares the PFSN of the table 715 with the PFSN 710, 710' and 710" in respective comparators 720, 720' and 720". If the current PFSN in the table 715 matches the PFSN 710, 710' and 710" and the Ready signal is active, the output admission policy 730 is notified that the packet-object is available to be passed to the output bus and that the available packet-object is the next in-sequence packet for that flow. As with the table 220 in the demux 200, the table 715 is initialized to zero then as packet-objects come in and are matched to the values in the output PFSN table 715, the packets are granted admission to the output bus, and the table PFSN value is updated. The output admission policy 730, which selects available packet-objects to be passed to the output bus, may be any output scheme, such as a round-robin mechanism or the like. The output admission priority may be crypto history-based to ensure that no packet-objects get stuck for long periods of time in any of the crypto-units.

While the present invention has been described with reference to the evaluation of packets to determine related packets, as will be appreciated by those of skill in the art in light of the present disclosure, such operations could be skipped and sequence identifiers assigned to each packet such that the order in which packets are received is maintained across multiple flows. However, while packet ordering may be maintained, such operations are not preferred as throughput of data which need not be ordered or of data which require differing times to process may be adversely affected by packets which require a long processing duration.

Furthermore, while embodiments of the present invention have been described with reference to a particular packet-object, other formats may be utilized. Thus, embodiments of the present invention should not be construed as limited to the use of the packet-object as described herein.

While the present invention has been described with respect to the multiplexer, demultiplexer and cryptographic processors as separate functions incorporated into a cryptographic processing system, as will be appreciated by those of skill in the art, such functions may be provided as separate functions, objects or applications which may cooperate with each other. Furthermore, the present invention has been described with reference to particular sequences of operations. However, as will be appreciated by those of skill in the art, other sequences may be utilized while still benefiting from the teachings of the present invention. Thus, while the present invention is described with respect to a particular division of functions or sequences of events, such divisions or sequences are merely illustrative of particular embodiments of the present invention and the present invention should not be construed as limited to such embodiments.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of transformation processing packets, comprising:
   receiving packets;
   assigning a sequence identifier to the packets, wherein the sequence identifier specifies a serial order associated with the packet;
   providing the packets to a plurality of parallel packet transform processors;
   processing the packets utilizing the packet transform processors so as to provide processed packets that have been transformed; and
   ordering the processed packets based on the sequence identifier of the packets.

2. The method of claim 1, further comprising a step of evaluating packets to classify the packets so as to identify related packets;
   wherein the step of assigning a sequence identifier to the packets comprises a step of assigning a sequence identifier to related packets, wherein the sequence identifier identifies an ordering of the related packets; and
   wherein the step of ordering the processed packets based on the sequence identifier of the packets comprises a step of ordering the processed packets based on the classification of the packets and the sequence identifier of the packets.

3. The method of claim 2, further comprising a step of assigning a flow identifier to related packets based on the evaluation of the packets.

4. The method of claim 3, wherein the step of evaluating packets comprises evaluating a source address, a destination address and a protocol associated with the packets; and
   wherein the step of assigning a flow identifier to related packets comprises assigning a flow identifier to related packets based on the source address, destination address and protocol associated with the packets.

5. The method of claim 3, wherein the step of evaluating packets comprises evaluating a destination address, a security parameter index and a protocol associated with the packets; and
   wherein the step of assigning a flow identifier to related packets comprises assigning a flow identifier to related packets based on the destination address, security parameter index and protocol associated with the packets.

6. The method of claim 5, wherein the step of assigning a flow identifier to related packets based on the destination address, security parameter index and protocol associated with the packets comprises assigning a flow identifier to related packets based on the destination address, security parameter index, port and protocol associated with the packets.

7. The method of claim 3, further comprising a step of generating the flow identifier of related packets based on information contained in the related packets.

8. The method of claim 7, wherein the packets comprise cryptographic packets.

9. The method of claim 8, further comprising a step of determining if the packet is a packet of an encrypting flow; and
   wherein the step of generating the flow identifier comprises hashing a source address, a destination address and a cryptographic protocol contained in the packets so as to provide the flow identifier if the packet is a packet of an encrypting flow.

10. The method of claim 8, further comprising a step of determining if the packet is a packet of a decrypting flow; and
    wherein the step of generating the flow identifier comprises hashing a destination address, a security parameter index and a cryptographic protocol contained in the packets so as to provide the flow identifier if the packet is a packet of a decrypting flow.

11. The method of claim 6, wherein the step of generating the flow identifier comprises a step of hashing fields of a packet to provide the flow identifier.

12. The method of claim 11, wherein the step of hashing fields of a packet comprises:
    multiplying the fields of the packet by respective prime numbers to provide multiplied values;
    summing the multiplied values so as to provide a sum; and
    determining a modulo of the largest prime number not greater than $2^n$ and the sum, wherein n is a number of bits in the resulting flow identifier.

13. The method of claim 11, wherein the step of hashing fields of a packet comprises:
    determining a modulo of the largest prime number not greater than $2^n$ and respective fields of the packet, wherein n is a number of bits in the resulting flow identifier so as to provide modulo results,
    multiplying the modulo results by respective prime numbers to provide multiplied values;
    summing the multiplied values.

14. The method of claim 2, wherein the step of ordering the processed packets based on the classification of the packets and the sequence identifier of the packets, comprises:
    controlling timing of an output of each of the parallel packet transform processors processing a related packet based on an output sequence value associated with the related packets so as to admit outputs of the parallel packet transform processors processing related packets in a sequence corresponding to the ordering of the related packets.

15. The method of claim 14, wherein the step of controlling timing of an output comprises:
maintaining a current output sequence value associated with the related packets;
determining if an output packet of one of the parallel packet transform processors has a sequence identifier corresponding to the current output sequence value; and
allowing the one of the parallel processors to output the output packet if the output packet has a sequence identifier corresponding to the current output sequence value.

16. The method of claim 15, further comprising a step of assigning a flow identifier to related packets based on the evaluation of the packets and wherein related packets are assigned a common identifier and different groups of related packets are assigned different flow identifiers.

17. The method of claim 16, further comprising a step of controlling output of the parallel processors based on the flow identifier of a processed packet and a sequence identifier of a processed packet.

18. The method of claim 17, wherein the step of controlling output of the parallel processors based on the flow identifier of a processed packet comprises controlling the output of the parallel processors so as to assure that processed packets with different flow identifiers will have an opportunity to be output.

19. The method of claim 1, wherein the packet transform processor comprise cryptographic processors and wherein the packets comprise cryptographic packets.

20. A method of controlling the processing of packets in a processing system having a plurality of parallel packet transform processors, comprising:
assigning a flow identifier to related packets;
assigning a sequence identifier to each packet of the related packets;
encapsulating the packet, the flow identifier and the sequence identifier to provide a packet-object;
providing the packet-object to one of the packet transform processor of the parallel packet transform processors;
processing the packet-object utilizing the one of the packet transform processors to provide a processed packet-object that has been transformed; and
selectively outputting the processed packet-object based on the flow identifier and the sequence identifier of the processed packet-object.

21. The method of claim 20, wherein the step of assigning a flow identifier comprises:
extracting selector values from a packet; and
hashing the selector values so as to provide the flow identifier.

22. The method of claim 21, wherein the packet transform processors comprise cryptographic processors and wherein the step of extracting selector values comprises:
determining if the packet is an inbound cryptographic packet or an outbound cryptographic packet;
extracting a source address, a destination address and protocol from the packet if the packet is an outbound cryptographic packet; and
extracting the destination address, security parameter index and protocol from the packet if the packet is an inbound cryptographic packet.

23. The method of claim 22, wherein the step of hashing the selector values so as to provide the flow identifier comprises:
multiplying the selector values by prime numbers;
summing results of the multiplication; and
determining a modulo of a largest prime number not greater than $2^n$ and the results of the sum, wherein n is a number of bits in the flow identifier.

24. The method of claim 22, wherein the step of hashing the selector values so as to provide the flow identifier comprises:
determining a modulo of a largest prime number not greater than $2^n$ and respective ones of the selector values to provide modulo values, wherein n is a number of bits in the flow identifier;
multiplying the modulo values by corresponding prime numbers; and
summing results of the multiplication.

25. The method of claim 20, further comprising a step of maintaining a table of sequence identifiers associated with flow identifiers; and
wherein the step of assigning a sequence identifier to each packet of the related packets comprises:
looking up a current sequence identifier in the table utilizing the flow identifier of the packet;
assigning the current sequence identifier to the packet;
incrementing the current sequence identifier to provide an updated current sequence identifier; and
storing the updated current sequence identifier in the table associated with the flow identifier of the packet.

26. The method of claim 20, wherein the step of selectively outputting the processed packet-object based on the flow identifier and the sequence identifier of the processed packet-object comprises:
determining if the sequence identifier of a processed packet-object corresponds to a current output sequence identifier for the flow identifier of the processed packet-object; and
outputting the processed packet-object if the current output sequence identifier for the flow identifier of the processed packet-object corresponds to the current output sequence identifier.

27. The method of claim 26, further comprising a step of maintaining a table of current output sequence identifiers associated with flow identifiers; and wherein the step of determining if the sequence identifier of a processed packet-object corresponds to a current output sequence identifier for the flow identifier of the processed packet-object comprises:
extracting the flow identifier and sequence identifier from a processed packet-object; looking up a current output sequence identifier in the table utilizing the flow identifier of the processed packet-object;
comparing the current output sequence identifier from the table with the sequence identifier extracted from the processed packet-object to determine if they are equal;
incrementing the current output sequence identifier to provide an updated current output sequence identifier if the current output sequence identifier and the extracted sequence identifier are equal; and
storing the updated current output sequence identifier in the table associated with the flow identifier of the processed packet-object.

28. A parallel packet transform processing system, comprising:
a plurality of packet transform processing units;
a packet-input demux configured to receive a serial stream of packets, identify a sequence of the received packets by assigning a sequence identifier to related packets, wherein the sequence identifier identifies an ordering of the related packets, and provide the packets to the plurality of packet transform processing units so as to allow parallel processing and transformation of the received packets; and a packet-output mux configured to receive processed packets from the plurality of packet transform processing units to order the processed packets based on the sequence identifier of the packets, and output the processed packets in the sequence identified by the packet-input demux.

29. The processing system of claim 28, wherein the plurality of packet transform processing units are configured to buffer processed packets for output so as to allow the packet transform processing units to process a plurality of packets prior to a processed packet being output by the packet-output mux.

30. The processing system of claim 28, wherein the packet-input demux is further configured to evaluate the received packets and assign a flow identifier to related packets based on the evaluation of the packets.

31. The processing system of claim 30, wherein the packet-input demux is configured to evaluate a source address, a destination address and a protocol associated with the packets assign a flow identifier to related packets based on the source address, destination address and protocol associated with the packets.

32. The processing system of claim 30, wherein the packet-input demux is further configured to evaluate a destination address, a security parameter index and a protocol associated with the packets and assign a flow identifier to related packets based on the destination address, security parameter index and protocol associated with the packets.

33. The processing system of claim 30, wherein the packet-input demux is configured to generate the flow identifier of related packets based on information contained in the related packets.

34. The processing system of claim 33, wherein the packet-input demux is further configured to determine if the packet is a packet of an encrypting flow and generate the flow identifier by hashing a source address, a destination address and a cryptographic protocol contained in the packets so as to provide the flow identifier if the packet is a packet of an encrypting flow.

35. The processing system of claim 33, wherein the packet-input demux is further configured to determine if the packet is a packet of a decrypting flow and generate the flow identifier by hashing a destination address, a security parameter index and a protocol contained in the packets so as to provide the flow identifier if the packet is a packet of a decrypting flow.

36. The processing system of claim 33, wherein the packet-input demux is configured to generate the flow identifier by hashing fields of a packet to provide the flow identifier.

37. The processing system of claim 36, wherein the packet-input demux is configured to hash fields of a packet by multiplying the fields of the packet by respective prime numbers to provide multiplied values, summing the multiplied values so as to provide a sum and determining a modulo $2^n$ of the sum, wherein n is a number of bits in the resulting flow identifier.

38. The processing system of claim 36, wherein the packet-input demux is configured to hash fields of a packet by determining a modulo $2^n$ of the fields to provide modulo values, wherein n is a number of bits in the resulting flow identifier, multiplying the modulo values by respective prime numbers to provide multiplied values and summing the multiplied values so as to provide a sum.

39. The processing system of claim 28, wherein the packet-output mux is configured to order the processed packets based on the sequence identifier of the packets by controlling timing of an output of each of the parallel packet transform processors processing a related packet based on an output sequence value associated with the related packets so as to admit outputs of the parallel packet transform processors processing related packets in a sequence corresponding to the ordering of the related packets.

40. The processing system of claim 39, wherein the packet-output mux is configured to control timing of the output by maintaining a current output sequence value associated with the related packets, determining if an output packet of one of the parallel processors has a sequence identifier corresponding to the current output sequence value and allowing the one of the parallel processors to output the output packet if the output packet has a sequence identifier corresponding to the current output sequence value.

41. The processing system of claim 40, wherein the packet-input demux is further configured to assign a flow identifier to related packets based on the evaluation of the packets, wherein the related packets comprise respective different related packets such that plurality of flow identifiers are assigned to the different related packets.

42. The processing system of claim 41, wherein the packet-output mux is further configured to control output of the parallel processors based on the flow identifier of a processed packet and a sequence identifier of a processed packet.

43. The processing system of claim 42, wherein the packet-output mux is configured to control output of the parallel processors based on the flow identifier of a processed packet by controlling the output of the parallel processors so as to assure that processed packets with different flow identifiers will have an opportunity to be output.

44. The processing system of claim 28, wherein the packet transform processors are cryptographic processors.

45. The processing system of claim 28, wherein the packet transform processors are compression processors.

46. A packet transformation processing system, comprising:
means for receiving packets;
means for assigning a sequence identifier to the packets, wherein the sequence identifier specifies a serial order associated with the packet;
means for providing the packets to a plurality of parallel packet transform processors;
means for processing the packets utilizing the packet transform processors so as to provide processed packets that have been transformed; and
means for ordering the processed packets based on the sequence identifier of the packets.

47. A system for processing of packets, comprising:
a plurality of parallel packet transform processors;
means for assigning a flow identifier to related packets;
means for assigning a sequence identifier to each packet of the related packets;
means for encapsulating the packet, the flow identifier and the sequence identifier to provide a packet-object;
means for providing the packet-object to one of the packet transform processor of the parallel packet transform processors;
means for processing the packet-object utilizing the one of the packet transform processors to provide a processed packet-object that has been transformed; and
means for selectively outputting the processed packet-object based on the flow identifier and the sequence identifier of the processed packet-object.

48. A computer program product of packet transformation processing, comprising:

a non-transitory computer readable medium having computer readable program code embodied therein, the computer readable program code comprising:

computer readable program code configured to receive packets;

computer readable program code configured to assign a sequence identifier to the packets, wherein the sequence identifier specifies a serial order associated with the packet;

computer readable program code configured to provide the packets to a plurality of parallel packet transform processors;

computer readable program code configured to process the packets utilizing the packet transform processors so as to provide processed packets that have been transformed; and computer readable program code configured to order the processed packets based on the sequence identifier of the packets.

49. A computer program product for processing of packets utilizing a plurality of parallel packet transform processors, comprising:

a non-transitory computer readable medium having computer readable program code embodied therein, the computer readable program code comprising:

computer readable program code configured to assign a flow identifier to related packets;

computer readable program code configured to assign a sequence identifier to each packet of the related packets;

computer readable program code configured to encapsulate the packet, the flow identifier and the sequence identifier to provide a packet-object;

computer readable program code configured to provide the packet-object to one of the packet transform processor of the parallel packet transform processors;

computer readable program code configured to process the packet-object utilizing the one of the packet transform processors to provide a processed packet-object that has been transformed; and computer readable program code configured to selectively output the processed packet-object based on the flow identifier and the sequence identifier of the processed packet-object.

* * * * *